United States Patent [19]

Berns

[11] Patent Number: 5,505,584
[45] Date of Patent: Apr. 9, 1996

[54] AIR OPERATED LOADING AND UNLOADING DEVICE

[75] Inventor: Joseph F. Berns, Cincinnati, Ohio

[73] Assignee: J. F. Berns Company, Inc., Cincinnati, Ohio

[21] Appl. No.: 278,390

[22] Filed: Jul. 21, 1994

[51] Int. Cl.[6] .................................................. B23B 13/10
[52] U.S. Cl. ..................... 414/745.1; 406/109; 82/125; 414/17
[58] Field of Search ................ 414/17, 18, 745.1; 82/127, 124, 125; 406/191, 108, 109, 110, 112

[56] References Cited

U.S. PATENT DOCUMENTS

| | | |
|---|---|---|
| 2,327,916 | 8/1943 | Mariotte . |
| 3,215,287 | 11/1965 | Bodan ........................................ 414/18 |
| 3,689,010 | 9/1972 | Alexandrov et al. ................... 406/110 |
| 3,706,428 | 12/1972 | Carlier ..................................... 406/110 |
| 3,823,628 | 7/1974 | Fortune .................................... 82/124 |
| 4,090,423 | 5/1978 | Waage ...................................... 82/127 |
| 4,129,220 | 12/1978 | Peterson et al. ......................... 414/18 |
| 4,406,190 | 9/1983 | Mason ...................................... 414/17 |
| 4,423,993 | 1/1984 | Eaton ....................................... 414/17 |
| 4,794,831 | 1/1989 | Cheng ...................................... 82/124 |
| 5,343,788 | 9/1994 | Goforth .................................... 414/17 |
| 5,347,896 | 9/1994 | Jones ....................................... 82/124 |

FOREIGN PATENT DOCUMENTS

| | | |
|---|---|---|
| 229265 | 7/1960 | Australia . |
| 672422 | 3/1939 | Germany . |
| 917158 | 1/1963 | United Kingdom . |

Primary Examiner—William E. Terrell
Assistant Examiner—Gregory A. Morse
Attorney, Agent, or Firm—Wood, Herron & Evans

[57] ABSTRACT

A loading and unloading mechanism including a workpiece receiving and discharging chamber and pressurized air/vacuum source operatively connected to the chamber. The chamber is tubular and adapted to be connected to the spindle of a lathe in a coaxial relationship. Pressurized air is used to force the workpiece into the lathe spindle and vacuum pressure is used to draw the workpiece out of the lathe and back into the tubular chamber. The device may be modified to facilitate vacuum unloading only in the case in which the lathe is manually loaded. A proximity switch is provided for detecting the passage of a finished workpiece out of the lathe and back into the chamber whereupon the chamber is opened and the workpiece is discharged.

24 Claims, 4 Drawing Sheets

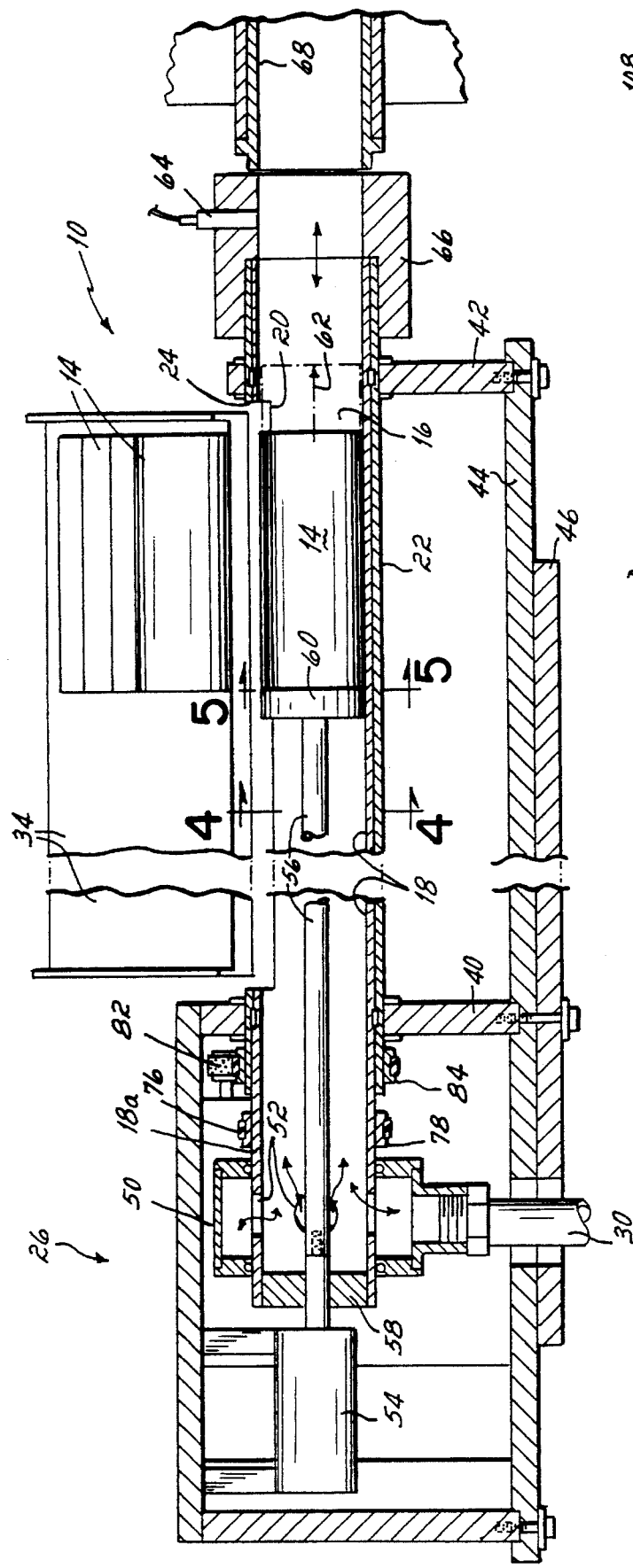
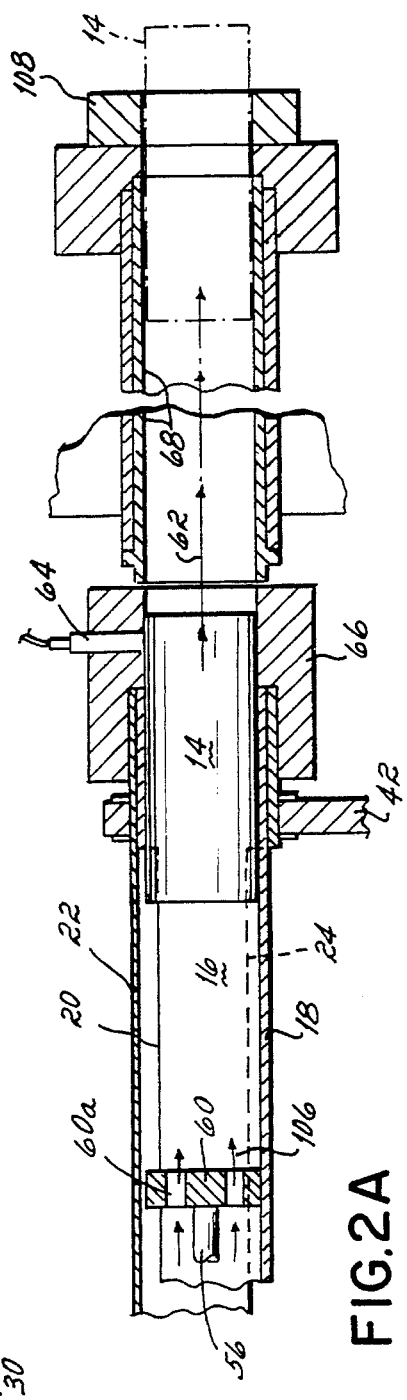
FIG.2
FIG.2A

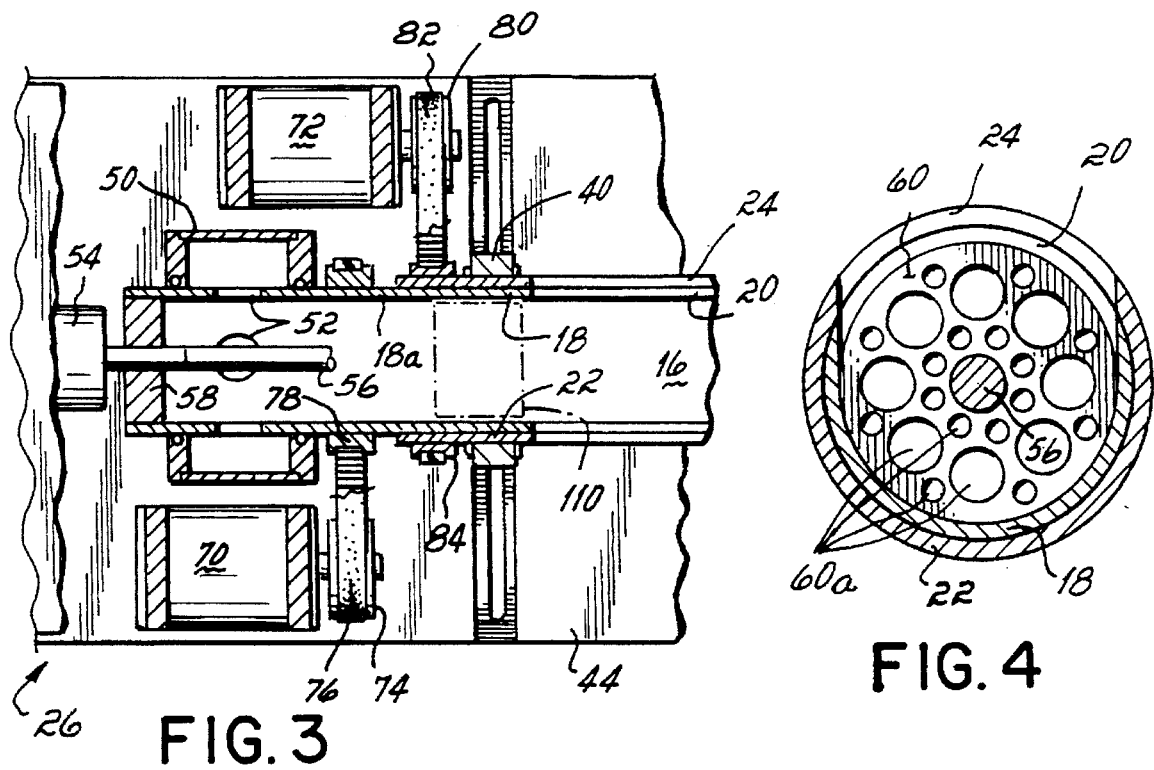
FIG. 3
FIG. 4
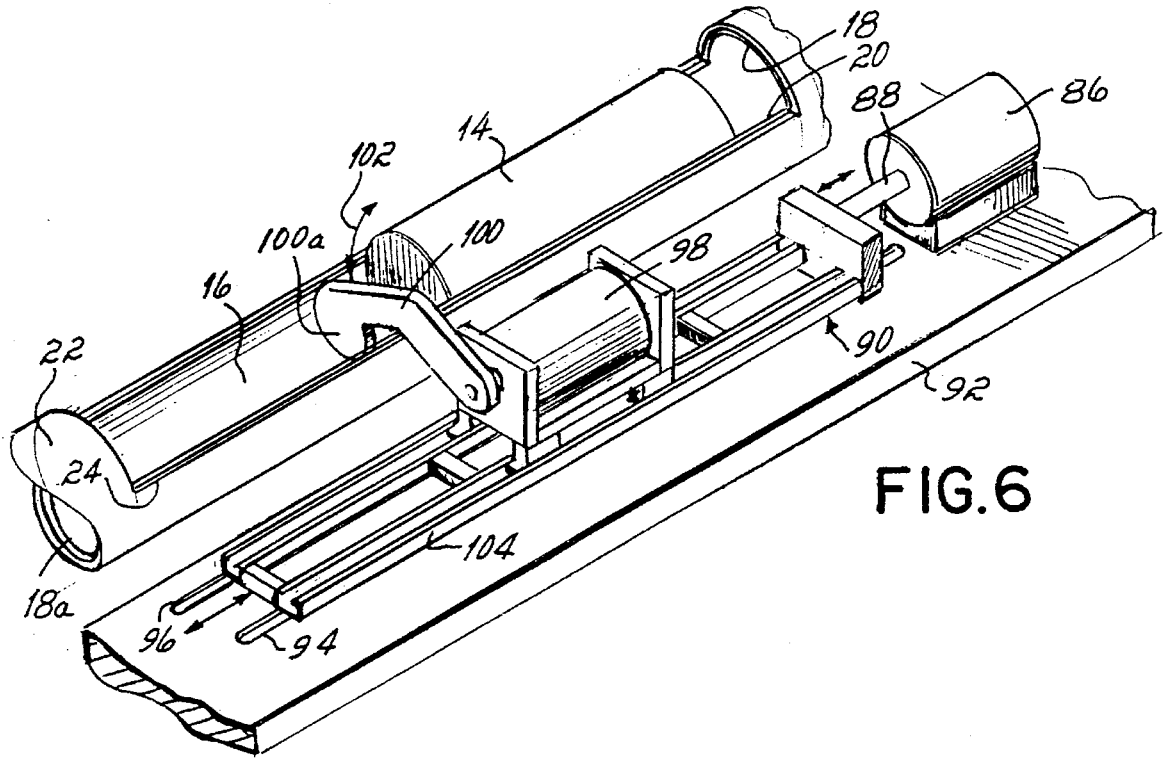
FIG. 6

AIR OPERATED LOADING AND UNLOADING DEVICE

BACKGROUND OF THE INVENTION

The present invention generally relates to loading and unloading apparatus for machine tools and the like. More particularly, the invention resides in a vacuum assisted loading and unloading device for use in connection with lathes.

It has now become common in the machine tool industry to automate the loading and unloading of workpieces into and out of a machine tool, such as a lathe, such that a workpiece is automatically placed into the machine prior to the machining operation and then automatically removed from the machine when the machining operation is completed. Operator intervention in many machining processes, along with the dangers and time usage associated therewith, have been significantly reduced as a result of such automation.

Many automated loading and unloading mechanisms have the severe drawback of being so complex and expensive that their use in all but the most elaborate and expensive machine tools is impractical. These loading and unloading mechanisms include, for example, robotic devices and other programmable or otherwise electronically controlled arms, indexing devices, etc. While there are needs in the industry for such sophisticated and expensive machine tool loading and unloading mechanisms, especially in connection with many high volume machining operations, these solutions to the problems associated with manual loading and unloading operations tend to be too expensive for lower volume work.

Although feeding mechanisms for lathes, for example, have been developed which are less complicated than those mentioned above in connection with high volume operations, these mechanisms often still tend to be too complicated and therefore too expensive to implement and maintain in smaller machine shops. Also, these mechanisms have generally utilized mechanical elements which physically contact the workpiece in order to move it into and/or out of the lathe. This leads to the undesirable results of mechanical breakdown of the mechanism, marring of the workpiece by the contacting element and often a relatively slow ingress and egress of the workpiece into and out of the lathe or machine tool.

It has therefore become clear that there is a need in the art for a loading and unloading mechanism, especially suitable for use with lathes, which is relatively low cost, low maintenance and reliable yet as fast or faster than many more complicated and more expensive feed mechanisms known in the art.

SUMMARY OF THE INVENTION

In furtherance of this need in the art, it has been one object of this invention to minimize the cost and complexity of loading and unloading mechanisms for machine tools such as lathes.

It has been another more specific object of the invention to provide a pressurized air and vacuum operated loading and unloading mechanism for a lathe which very quickly loads and unloads a lathe.

It has been another object of the invention to provide such a mechanism with few moving parts and with minimal physical contact between the workpiece and any moving elements of the mechanism.

It has been yet another object of the invention to provide a tubular workpiece receiving chamber which may be pressurized to respectively force the workpiece into the lathe and draw the workpiece out of the lathe.

It has been a further object of the invention to facilitate easy loading and unloading of workpieces to and from the tubular workpiece receiving chamber.

To these ends, the present invention is embodied in a loading and unloading mechanism including a workpiece receiving chamber and pressurized air generator operatively connected to the chamber. The chamber is tubular and adapted to be connected to or in communication with the spindle of a lathe in a coaxial relationship. The pressurized air generator is used to pressurize the chamber and thereby move the workpiece through the chamber in at least one direction. Most preferably, pressurized air is supplied by a pump operatively connected to one end of the chamber to force the workpiece into the lathe spindle and vacuum pressure, which may be produced by the same pump which provides the pressurized air, is used to draw the workpiece out of the lathe and back into the tubular chamber.

The workpiece receiving chamber is more specifically constructed from pair of tubular elements sized to receive an elongated workpiece, such as a cylindrical workpiece, in a sliding relationship. One tubular element is an "inner" tube located concentrically within the second tubular element or "outer" tube. Both the inner and outer tubes include elongated slots of sufficient width and length to receive the workpiece. At least one of the tubes is rotatable with respect to the other tube so as to selectively register or align the slots of the two tubes such that the workpiece may pass through the slots both into and out of the inner tube.

Preferably, both the inner and outer tubes are rotatable such that the slots may be aligned in two different positions which preferably include an upwardly opening position for receiving the workpiece and a downwardly opening position for releasing the workpiece after the machining process is over and the workpiece has been drawn back into the inner tube by vacuum. When the two slots are positioned such that one slot does not communicate with the other at all, such as when the slots are positioned 180° apart, an air lock is created between the two tubes such that pressurized air and vacuum pressure within the effectively sealed workpiece receiving chamber may respectively move the workpiece into and out of the lathe through the inner tube.

When the device of the present invention is used as both a loader and unloader, a cylinder and piston including a workpiece engaging element facilitates movement of the front end of the workpiece just past a forward end of the inner tube's elongated slot. This prevents pressurized air from circumventing the workpiece by travelling around the workpiece through the slot of the inner tube and out through the lathe spindle and chuck. With the workpiece moved past the forward end of the inner tube's elongated slot, pressurized air will impinge mainly against the rearward end of the workpiece thereby propelling the workpiece into the lathe spindle and chuck. In one embodiment, the piston itself is the workpiece engaging element while in another embodiment the piston and cylinder are mounted alongside the tubes and move a longitudinally adjustable rotary actuator along a track. The rotary actuator includes a workpiece engaging element which may be rotated into and out of a position within the chamber facilitating engagement with the workpiece.

For those applications in which it is desired to only have automatic unloading of the workpieces from the lathe, such as when the workpiece is manually loaded into the lathe, the present invention may be constructed to facilitate unloading only. In this regard, one of the tubes may be fixed with respect to the other with its elongated slot disposed in a workpiece releasing position, such as downwardly facing position. The other tube may then be rotatably mounted to allow selective alignment of its slot with the slot of the fixed tube. When the workpiece receiving chamber is completely closed, pressure may be introduced into the chamber to move the workpiece out of the lathe and into the chamber. Preferably, this pressure is negative or vacuum pressure introduced at the end of the chamber opposite the lathe to thereby create suction toward that end and draw the workpiece out of the lathe. When the rotatable tube is then rotated to align the slots of the fixed and rotatable tubes, the workpiece is automatically released from the tubes. It will be appreciated that in this alternative, there is no need for a workpiece engaging element, however, there is a need for a stop member in the inner tube for stopping the workpiece after it is drawn or forced by air pressure out of the lathe.

In another aspect of the invention, a proximity switch is provided, preferably between the lathe and the concentric tubes, for detecting the passage of a finished workpiece out of the lathe and back into the inner tube or chamber. Upon activation of the switch in this manner, a signal is sent to a suitable control which results in one or both of the tubes being rotated to a release position which is preferably defined by the slots being aligned in a downwardly opening direction. In this way, the finished workpiece is immediately dropped from the tubes into, for example, a receiving tray.

Further objects and advantages of the invention will become more readily apparent to those of ordinary skill in the art upon review of the following detailed description of the invention taken in conjunction with the accompanying drawings.

BRIEF DESCRIPTION OF THE DRAWINGS

FIG. 2 is a cross sectional view of the device of FIG. 1 taken along line 2—2 thereof;

FIG. 2A is a cross sectional view similar to FIG. 2 but only showing the front end of the device with a workpiece in process of being forced by air pressure into the lathe;

FIG. 3 is a top view of a rear end portion of the device shown in FIG. 1, partially fragmented to more clearly illustrate the components contained therein;

FIG. 4 is a cross sectional view taken along line 4—4 of FIG. 2 and showing the detail of the perforated piston of the preferred embodiment;

DETAILED DESCRIPTION OF THE PREFERRED EMBODIMENTS

Figure 1:
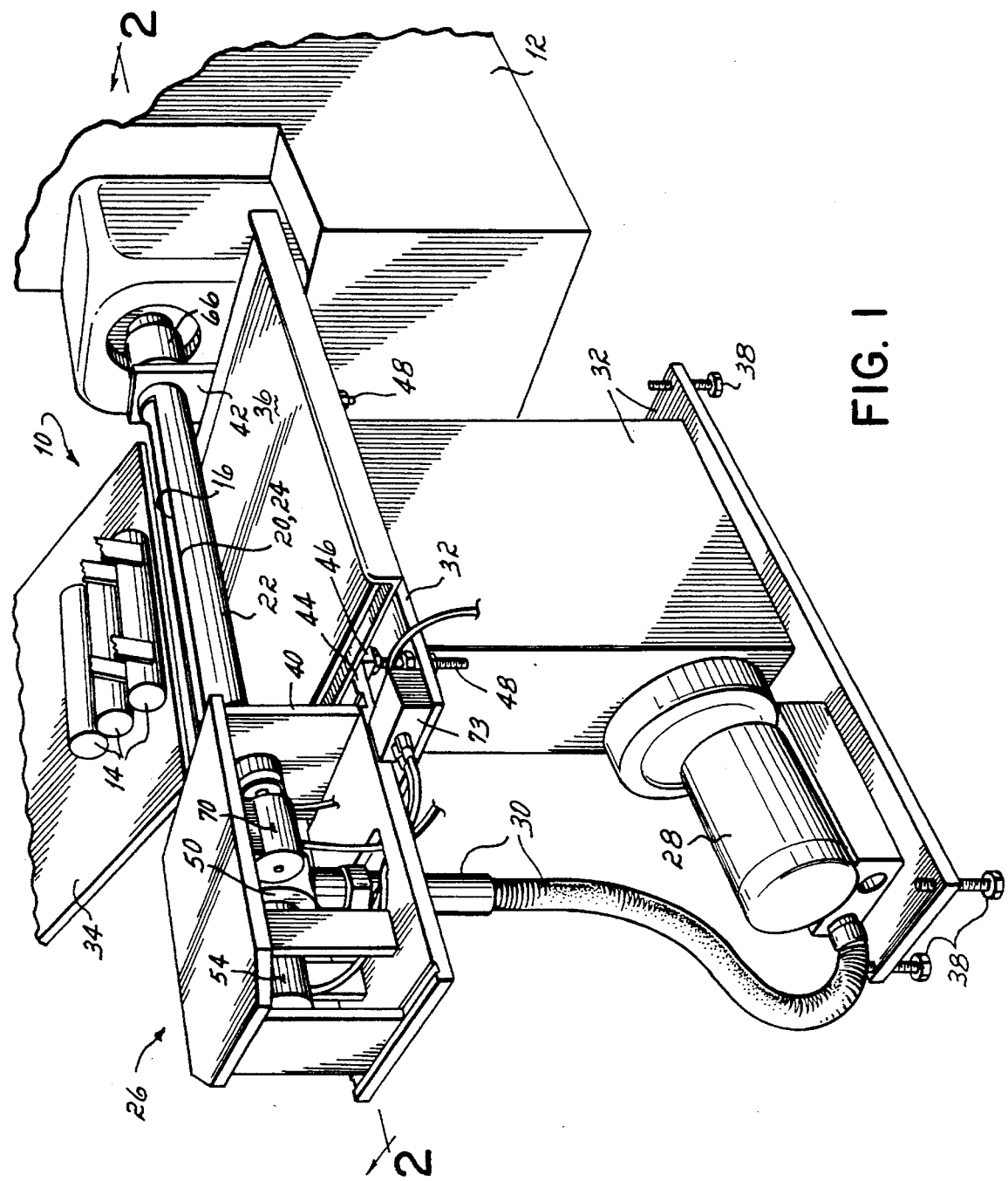
FIG. 1 is a perspective view of a vacuum operated loading and unloading device shown connected to a lathe and constructed in accordance with a preferred embodiment of the invention.

Referring to FIGS. 1 and 2, a preferred embodiment of the present invention is illustrated and comprises a vacuum operated loading and unloading device 10. For illustration purposes and to provide a better understanding of the invention, device 10 is shown connected to a conventional "CNC" lathe 12. Generally stated, device 10 receives workpieces 14, shown as cylindrically shaped steel workpieces, into a correspondingly shaped workpiece receiving chamber 16 through which workpieces 14 are fed into and retrieved from lathe 12. Chamber 16 is comprised of an inner cylindrical tube 18 having an elongated slot 20 and an outer cylindrical tube 22 also having an elongated slot 24. Inner tube 18 is contained within and is concentric or coaxial with outer tube 22 such that tubes 18, 22 may be rotated relative to one another. Tubes 18, 22 may be formed from a relatively rigid polymeric material such as polyvinylchloride (PVC).

Device 10 further generally includes a workpiece chamber operating end 26 which contains various components, to be described, for both rotating tubes 18, 22 and for providing pressurized air and vacuum pressure to workpiece receiving chamber 16. For the purpose of providing both pressurized air and vacuum pressure to workpiece chamber 16, a pump 28 is provided and is operatively connected to a rearward end of the workpiece chamber 16 by way of a hose 30. Preferably, pump 28 may be reversed in operation to provide both negative or vacuum pressure and positive pressurized air to workpiece chamber 16. Pump 28 is attached to a base 32 of device 10 with the base 32 further providing support for tubes 18, 22 as well as the structure comprising chamber operating end 26, a workpiece feeding tray 34 for selectively dropping workpieces 14 into chamber 16 and a workpiece receiving tray 36. Base 32 also includes height adjustable foot pads 38.

Referring to the further detail provided in FIG. 2, a pair of mounts 40, 42 are provided for supporting tubes 18, 22. Specifically, mounts 40, 42 are located approximately at the ends of the outer tube 22 and serve as bushings to allow rotation of outer tube 22 therein. The outer diameter of inner tube 18 is sized to allow rotation thereof within outer tube 22 and, therefore, outer tube 22 effectively provides a rotatable mounting for inner tube 18. Mounts 40, 42 are rigidly affixed to a first mounting plate 44 which, in turn, is rigidly affixed to a second mounting plate 46. Mounting plate 46 is secured to base 32 in a height adjustable fashion by way of adjustable threaded rods 48 (FIG. 1), only two out of at least four such rods 48 being shown in FIG. 1. The adjustability provided by threaded rods 48 allows the central axis of workpiece 14 contained in workpiece chamber 16 to be coaxial with the turn axis of lathe 12. To prevent lateral movement of workpiece within inner tube 18, the inner diameter of the inner tube 18 is chosen to be only slightly greater than the outer diameter of workpiece 14 such that only longitudinal sliding movement of workpiece 14 is allowed within inner tube 18 and such that the central axes of tubes 18, 22 also substantially coincide with the turn axis of lathe 12.

Still referring to FIG. 2, workpiece chamber operating end 26 includes an annular air pressure sleeve 50 which completely surrounds a rear end portion 18a of inner tube 18. To enable this connection, rear end portion 18a of inner tube 18 extends outwardly or rearwardly from the rear end of outer tube 22. Air pressure sleeve 50 is coupled to hose 30 which leads to pump 28. Holes 52 are provided through end portion 18a preferably at 90° spaced locations within air pressure sleeve 50. This allows the positive and negative air pressure to be introduced into workpiece chamber 16 from pump 28 during respective loading and unloading operations to be described in more detail below.

A fluid operated cylinder 54, such as a pneumatic cylinder, is also mounted at workpiece chamber operating end 26. Cylinder 54 includes a piston rod 56 extending into workpiece chamber 16 through an end cap 58 provided at the end of inner tube 18. End cap 58, taken with piston rod 56, provides a seal effective for preventing air pressure leakage through the rear end of inner tube 18 when pump 28 is turned on. Piston rod 56 includes a piston 60 at its forward end which acts as a workpiece engaging member for moving a workpiece 14 in the direction of arrow 62 to the position shown in phantom in FIG. 2. As shown in FIG. 4, piston 60 includes a plurality of apertures 60a for allowing the passage of positive or negative pressurized air therethrough during loading and operations of workpiece 14. Preferably, piston 60 is formed of a relatively soft, non-marring polymeric material such that workpiece 14 is not scratched or otherwise marred during engagement therewith. Cylinder 54 may, for example, have a two inch stroke for providing the initial movement of workpiece 14 after it has been loaded into chamber 16 from feeding tray 34. This initial movement of workpiece 14 is necessary to provide a seal against positive pressurized air, used to move workpiece 14 into lathe 12, from bypassing or circumventing workpiece 14 by way of slot 20 of inner tube 18.

It will be appreciated that for those situations in which workpiece 14 is manually loaded into lathe 12, the present invention contemplates versions thereof in which device 10 is used as an unloader only. In this regard, for example, outer tube 22 may be fixed in a downwardly facing position. The means for rotating the outer tube (described below) may be eliminated as may cylinder 54, rod 56 and piston 60. Of course, end cap 58 would then be modified to completely seal the end of tube 18. A stop member 110 (FIG. 3) is then inserted in inner tube 18 to take the place of piston 60 which acts as a stop member in the case in which device 10 is used as a loader and unloader. As will be appreciated from the further description provided hereinbelow, device 10 as so modified to be an unloader only may be used in vacuum mode to automatically unload workpieces 14 from lathe 12.

Whether device 10 is used as a loader and unloader or an unloader only, a proximity switch 64 is mounted within a front end cap 66 which is disposed between outer tube 22 and lathe 12 and which provides a seal between lathe 12 and the lathe spindle or, as shown in FIG. 2, the spindle liner 68. Cap 66 may, for example, be formed of Nylon and there may be a slight gap between cap 66 and spindle liner 68 is long as the gap is not so significant as to cause pressure leakage adversely slowing the movement of workpiece 14 within chamber 16 and spindle liner 68. Proximity switch 64 is more specifically used to cause a signal to be sent to a suitable control upon passage of a finished workpiece 14 from lathe 12 back into chamber 16. As discussed below, this signal may be used to cause a suitable conventional control device to open chamber 16 thereby dropping the finished workpiece 14 onto receiving tray 36.

Figure 5A:
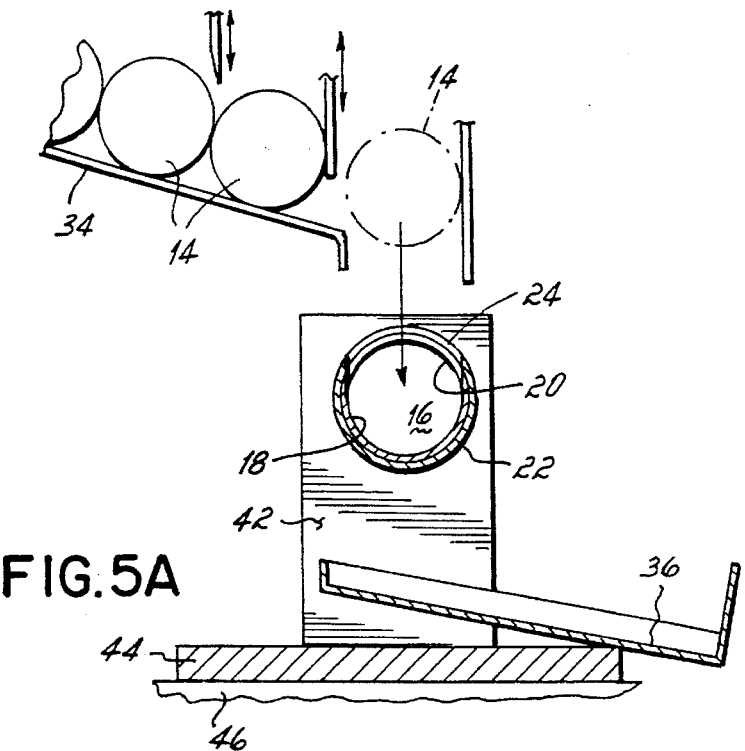
FIG. 5A is an cross-sectional view taken along 5—5 of FIG. 2 schematically illustrating the inner and outer tubes rotated to a position in which they open upwardly to receive a workpiece.
Figure 5B:
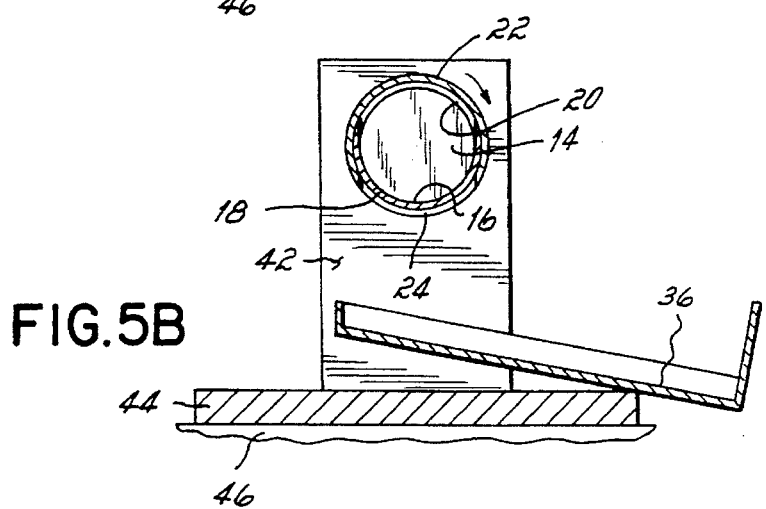
FIG. 5B is a cross-sectional view similar to FIG. 5A but showing the outer tube rotated to a position which closes the workpiece receiving chamber with a workpiece contained therein.
Figure 5C:
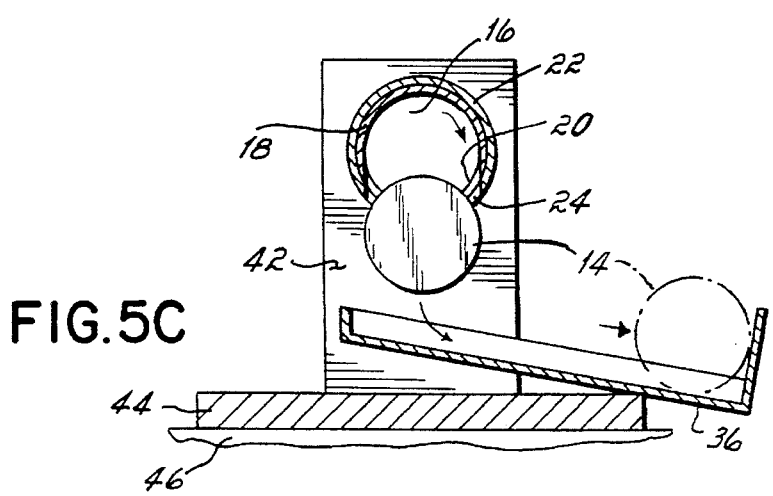
FIG. 5C is a cross-sectional view similar to FIGS. 5A and 5B but showing the inner and outer tubes rotated to a downwardly opening position and a finished workpiece being dropped onto a receiving tray; and, FIG. 6 is a schematic perspective view of an alternative embodiment of the workpiece engaging element of the invention which is used to move the workpiece ahead of the slots in the inner and outer tubes.

As illustrated best in FIG. 3, workpiece operating end 26 includes devices for opening and closing workpiece chamber 16. Specifically, rotary actuators 70, 72 are provided for separately rotating tubes 18, 22 preferably between three different positions. A first position, shown in FIG. 5A, is a workpiece receiving position in which slots 20, 24 of respective tubes 18, 22 open upwardly to receive a workpiece 14 dropped from feeding tray 34. A second position, shown in FIG. 5B, is a workpiece moving position in which outer tube 22 has been rotated 180° such that slot 24 faces downwardly. Since slots 20, 24 do not align at all in this position and since there is a close, sliding fit between tubes 18 and 22, an air lock is created between tubes 18 and 22 such that positive and negative air pressure provided by pump 28 via sleeve 50 may move workpiece back and forth within chamber 16. A third position, shown in FIG. 5C, is a workpiece releasing position, in which inner tube 18 has been rotated 180° to align with the downwardly facing slot 24 of outer tube 22. In this position, the finished workpiece 14 is dropped onto receiving tray 36.

Although the specific devices and components used to rotate tubes 18 and 22 may be readily changed by those of ordinary skill, it is preferred to use pneumatically operated rotary actuators 70, 72 controlled by, for example, a solenoid valve 73 (FIG. 1) and coupled by respective gear belts 76 and 82 to the inner and outer tubes 18 and 22. More particularly, rotary actuator 70 rotates an output pulley 74 connected to gear belt 76 and gear belt 76 extends around a toothed annular sleeve 78 which is rigidly affixed to the outside surface of end portion 18a 572 of inner tube 18. Likewise, rotary actuator 72 rotates an output pulley 80 connected to gear belt 82 and gear belt 82 extends around a toothed annular sleeve 84 which is rigidly affixed to the outer surface of tube 22. It will thus be appreciated that rotary actuators 70, 72 each operate to rotate the respective tubes 18, 22 back and forth between upwardly facing and downwardly facing positions as previously described.

FIG. 6 shows an alternative embodiment of a workpiece engagement mechanism having the same function as, but certain advantages over, the engagement mechanism previously described comprising the cylinder 54 and piston 60. Specifically, it will be appreciated that for longer or shorter workpieces than the one shown herein, the length of the piston rod 56 shown in the first embodiment would have to be correspondingly changed assuming the stroke of cylinder 54 remains the same. In the alternative embodiment shown in FIG. 6, a fluid operated cylinder 86 is mounted adjacent to inner and outer tubes 18, 22 and includes a linearly actuatable piston rod 88 having, for example, a two inch stroke as does cylinder 54 of the first embodiment. Rod 88 is connected to an engagement member mounting and adjustment assembly 90. Mounting and adjustment assembly 90 is mounted for a two inch stroke along a guide 92 for movement in a direction parallel to the axes of tubes 18, 22. Specifically, assembly 90 preferably includes downwardly depending guide members (not shown) which slide within a pair of slots 94, 96 contained in guide 92. Assembly 90 further includes an adjustably positionable, bidirectional rotary actuator 98 having a workpiece engagement member 100 connected to the rotatable output shaft thereof. Member 100 is movable in a direction indicated by arrow 102 such that an end portion 100a thereof is disposed within chamber 16 through slots 20, 24 and also in an opposite direction such that chamber 16 may be closed by rotation of, for example, the outer tube 22. Rotary actuator 98 is movable along a pair of tracks 104 which comprise a further portion of assembly 90. Thus, actuator 98 may be moved along track 104 according to the length of the particular workpiece 14 and then rigidly affixed by an conventional fastening means such as thumb screws (not shown) at that position.

OPERATION

Referring now to FIG. 1 taken in conjunction with FIG. 5A, to initiate the loading process, when device 10 is used as a loader and unloader, a workpiece 14 is first dropped from feeding tray 34 into inner tube 18 after slots 20, 24 have been aligned in an upwardly opened position by rotation of tubes 18, 22. A proximity switch (not shown) may be used to detect the passage of a workpiece 14 into inner tube 18, whereupon solenoid valve 73 (FIG. 1) is actuated to activate rotary actuator 72 which rotates outer tube 22 relative to inner tube 18 such that slot 24 is facing downwardly as shown in FIG. 5B thereby closing and effectively sealing chamber 16. As shown in FIG. 2, piston 60 is moved by cylinder 54 to slide workpiece 14 just ahead of the forward end of slot 20 to the position shown in phantom. Alternatively, the mechanism shown in FIG. 6 may be used to provide this initial movement of workpiece 14 which prevents circumvention of workpiece 14 by pressurized air from pump 28. Then, as shown in FIG. 2A, pressurized air indicated by direction arrows 106 acts against workpiece 14 to propel it through chamber 16 and spindle liner 68 of lathe 12 to the position shown in phantom in which one end thereof is contained in the chuck 108 of lathe 12. Chuck 108 is then tightened and workpiece 14 is machined.

Vacuum pressure may be provided in the closed chamber 16 while the workpiece 14 is being machined such that, when the machining operation is over and collet 108 is loosened, vacuum pressure in chamber 16 and spindle liner 68 will immediately draw the finished workpiece 14 back out of the lathe and into inner tube 18 or, more broadly speaking, into receiving chamber 16 until it stops against piston 60 generally in the position shown in solid in FIG. 2. Alternatively, in the case in which device 10 is only an unloader, workpiece stops against stop member 110 shown in phantom in FIG. 3. In either case, when workpiece 14 passes proximity switch 64 on its way out of lathe 12, a signal is sent to a suitable control device such as a relay which activates solenoid valve 73 to cause rotary actuator 70 to rotate inner tube 18 relative to outer tube 22 to the position shown in FIG. 5C. This aligns slots 20, 24 and drops workpiece 14 onto inclined receiving tray 36. Thereafter, tubes 18, 22 are both rotated 180° to the upwardly opening position of FIG. 5A and another workpiece 14 is dropped into chamber 16 and the process repeats. Alternatively, tubes 18, 22 are rotated to the closed position of FIG. 5B and another workpiece is manually loaded into lathe 12 for the case in which device 10 is to be used as an unloader only.

Although preferred embodiments of the present invention have been described in detail above, those of ordinary skill will readily recognize many modifications and substitutions of components thereof which nevertheless fall within the spirit and scope of the invention. Therefore, Applicant's intention is to be bound not by the details of these preferred embodiments but only by the legal scope of the appended claims.

What is claimed is:

1. A device for effecting at least one of a loading and unloading operation of a machine tool, said device comprising:

a base adapted to be mounted adjacent to said machine tool;

a pair of concentrically disposed inner and outer tubular elements, each of each tubular elements including an elongate opening for allowing passage of said workpiece into an inner chamber defined within said tubular elements, a di inner chamber adapted to communicate with a spindle of said machine tool, at least one of said tubular elements being mounted for rotation with respect to the other;

a rotary actuating mechanism operative connected to said one tuublar element to allow selective alignment of the elongate openings of each tubular element; and, an air pressure genrator operatively connected to said chamber for pressurizing said chamber and therby moving said workpiece through said chamber.

2. The device of claim 1 wherein said air pressure generator is a pump operatively connected to one end of said chamber for negatively pressurizing said chamber and thereby moving said workpiece toward said one end.

3. The device of claim 1 wherein said air pressure generator is a pump operatively connected to one end of said chamber for positively pressurizing said chamber and thereby moving said workpiece away from said one end.

4. The device of claim I wherein said air pressure generator is a reversible pump operatively connected to one end of said chamber for selectively pressurizing said chamber both negatively and positively and thereby selectively moving said workpiece selectively toward and away from said one end.

5. The device of claim 1 wherein both said inner and outer tubular elements are mounted for rotation with respect to each other, each of said tubular elements being operatively connected to a rotary actuating mechanism, said inner and outer tubular elements thereby being rotatable between a workpiece receiving position, a closed position and a workpiece discharging position.

6. The device of claim 5 further comprising a workpiece engaging and moving element operable to move said workpiece in said chamber to a position wherein at least a portion of said workpiece is disposed ahead of one end of the elongate opening of said inner tubular element.

7. The device of claim 6 wherein said workpiece engaging and moving element comprises a fluid operated cylinder having a reciprocable piston rod and a workpiece contacting element operatively connected to said piston rod.

8. The device of claim 7 wherein said piston rod extends through said inner tube and said workpiece contacting element comprises a perforated piston connected to an outer end of said piston rod.

9. The device of claim 7 wherein said workpiece contacting element is connected to an adjustable mounting assembly so as to be selectively movable into and out of said chamber, said adjustable mounting assembly further being longitudinally adjustable such that said workpiece contacting element may be adjusted along the length of said chamber to thereby facilitate engagement with workpieces of various lengths.

10. The device of claim 9 wherein said adjustable mounting assembly includes a rotary actuator, said workpiece contacting element being connected to a rotary output thereof.

11. The device of claim 5 wherein said workpiece receiving position is defined by said elongate openings being aligned in an upwardly facing direction, said workpiece discharging position is defined by said elongate openings being aligned in a downwardly facing direction and said closed position is defined by one of said elongate openings being disposed in an upwardly facing direction and one of said elongate openings being disposed in a downwardly facing direction.

12. The device of claim 11 further comprising a workpiece feeding tray mounted above said tubular elements and operable to selectively drop workpieces into said chamber when said tubular elements are in said workpiece receiving position.

13. The device of claim 12 further comprising a workpiece receiving tray mounted below said tubular elements and operable to receive workpieces dropped from said chamber when said tubular elements are in said workpiece discharging position.

14. The device of claim 11 further comprising a proximity switch operatively connected with said chamber for detecting movement of said workpiece through said chamber and providing a signal indicative of said movement.

15. The device of claim 14 further comprising means for activating one of said rotary actuating mechanisms and thereby rotating one of said inner and outer tubular elements in response to said signal such that said elongate openings are aligned in said workpiece discharging position.

16. The device of claim 1 further comprising a proximity switch operatively connected with said chamber for detecting movement of said workpiece through said chamber and providing a signal indicative of said movement.

17. The device of claim 16 further comprising means for activating said rotary actuating mechanism in response to said signal such that said workpiece may be discharged from said chamber.

18. A device for unloading a workpiece from a machine tool, said device comprising:

a base adapted to be mounted adjacent to said machine tool;

a pair of concentrically disposed inner and outer tubular elements mounted to said base, each of said tubular elements including an elongate opening for allowing passage of said workpiece therethrough, at least one of said tubular elements being mounted for rotation with respect to the other, and a rotary actuating mechanism operatively connected to said one tubular element to allow selective alignment of the elongate openings of each tubular element, said inner and outer tubular elements defining a chamber having a first end adapted to communicate with a spindle of said machine tool, said chamber sized to receive a workpiece therein so as to permit sliding movement of said workpiece within said chamber;

a pump operatively connected to a second end of said chamber for negatively pressurizing said chamber and thereby suctioning said workpiece out of said spindle and toward said second end.

19. A device for loading and unloading a machine tool, said device comprising:

a base adapted to be mounted adjacent to said machine tool;

a pair of concentrically disposed inner and outer tubular elements mounted to said base, each of said tubular elements including an elongate opening for allowing passage of said workpiece therethrough and both said inner and outer tubular elements being mounted for rotation with respect to each other, said inner and outer tubular elements defining a chamber having a first end adapted to communicate with a spindle of said machine tool, said chamber sized to receive a workpiece therein so as to permit sliding movement of said workpiece within said chamber;

first and second rotary actuating mechanisms operatively connected to the respective inner and outer tubular elements, said inner and outer tubular elements thereby being rotatable between a workpiece receiving position, a closed position and a workpiece discharging position, a reversible pump operatively connected to a second end of said chamber for selectively pressurizing said chamber both positively and negatively and thereby selectively moving said workpiece respectively into and out of said spindle.

20. A method of loading a workpiece into a machine tool spindle, the method comprising the steps of:

dropping said workpiece through aligned elongate openings in a pair of concentrically mounted tubular elements connected to a spindle of said machine tool;

sealing said tube by rotating at least one of said tubular elements so that the elongate openings are not in communication with each other and thereby forming a chamber containing said workpiece and allowing pressurization of said chamber to move said workpiece through said chamber;

pressurizing said chamber to move said workpiece in a first direction into said spindle; and, locking said workpiece within said spindle.

21. The method of claim 20 further comprising a method of unloading said workpiece from said spindle, including the further steps of:

unlocking said workpiece from said spindle;

pressurizing said chamber to move said workpiece in a second direction away from said spindle and into said chamber; and, unloading said workpiece from said chamber.

22. The method of claim 21 wherein the step of unloading said workpiece from said chamber further comprises rotating at least one of said inner and outer tubular elements to align said elongate openings.

23. The method of claim 22 wherein the step of unloading said workpiece from said chamber further comprises aligning said elongate openings generally downwardly and dropping said workpiece from said chamber.

24. A method of unloading a workpiece locked in a machine tool spindle through a pair of concentrically mounted tubular elements each having an elongate opening and together defining an communicating with said spindle, the method comprising the steps of:

sealing said tube by rotating at least one of said tubular elements such that said elongate openings are not in communication with each other and thereby allowing pressurization of said chamber to move said workpiece through said chamber;

unlocking said workpiece from said spindle;

pressurizing said chamber to move said workpiece away from said spindle; and, unloading said workpiece from said chamber by rotating at least one of said tubular elements such that said elongate openings aligned in a generally downward orientation.

\* \* \* \* \*

UNITED STATES PATENT AND TRADEMARK OFFICE
CERTIFICATE OF CORRECTION

PATENT NO. : 5,505,584
DATED : April 9, 1996
INVENTOR(S) : Joseph F. Berns

It is certified that error appears in the above-indentified patent and that said Letters Patent is hereby corrected as shown below:

Column 6, line 27 delete "572".

Column 7, line 64 delete second occurrence of "each" and replace with --said--.

Column 7, line 66 delete "a di" and replace with --said--.

Column 8, line 5 "tuublar" should read --tubular--.

Column 10, line 46 insert "inner chamber" between "an" and "communicating".

Column 10, line 59 insert "are" between "openings" and "aligned".

Signed and Sealed this

Eighth Day of October, 1996

*Attest:*

BRUCE LEHMAN

*Attesting Officer*     *Commissioner of Patents and Trademarks*